United States Patent
McHugh et al.

(10) Patent No.: US 6,881,079 B2
(45) Date of Patent: Apr. 19, 2005

(54) TECHNIQUE FOR PROVIDING POWER TO A COMPLETION USED IN A SUBTERRANEAN ENVIRONMENT

(75) Inventors: Marcus D. McHugh, Paris (FR); Lee S. Kobylinski, Bartlesville, OK (US); Des D'Arcy, Thornton Dale (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 137 days.

(21) Appl. No.: 10/068,076

(22) Filed: Feb. 6, 2002

(65) Prior Publication Data

US 2003/0148638 A1 Aug. 7, 2003

(51) Int. Cl.⁷ .............................................. H01R 13/44
(52) U.S. Cl. ........................ 439/136; 166/207; 439/156
(58) Field of Search ................................ 439/191, 128, 439/156, 265, 268; 166/207, 65.1, 380, 384, 242.6; 29/869, 755; 174/84 R

(56) References Cited

U.S. PATENT DOCUMENTS

| | | | | |
|---|---|---|---|---|
| 4,660,910 A | * | 4/1987 | Sharp et al. ................. | 439/194 |
| 5,070,940 A | * | 12/1991 | Conner et al. .............. | 166/65.1 |
| 5,795,169 A | * | 8/1998 | Reed ........................... | 439/191 |
| 6,164,375 A | * | 12/2000 | Carisella ..................... | 166/65.1 |
| 6,511,335 B1 | * | 1/2003 | Rayssiguier et al. ........ | 439/191 |
| 6,545,221 B1 | * | 4/2003 | Halpert et al. ............. | 174/84 R |

* cited by examiner

*Primary Examiner*—Michael C. Zarroli
(74) *Attorney, Agent, or Firm*—Robert Van Someren PC; Jaime A. Castaño; Brigitte Echols

(57) ABSTRACT

A splicing system that accommodates the splicing of tubing having internal power cable. The splice system is amenable to use in subterranean environments where sections of continuous tubing are spliced along with the splicing of internal power cable. The splice technique comprises utilization of an expandable connector that permits lineal movement of the internal segments of power cable.

25 Claims, 6 Drawing Sheets

TECHNIQUE FOR PROVIDING POWER TO A COMPLETION USED IN A SUBTERRANEAN ENVIRONMENT

FIELD OF THE INVENTION

The present invention relates generally to a technique for providing electrical current to a subterranean completion, and particularly to a technique for splicing both deployment tubing and power cable.

BACKGROUND OF THE INVENTION

A variety of completions, such as electric submersible pumping systems, are deployed in wellbores and at other subterranean locations. Many of these systems are deployed by tubing, such as coiled tubing. Power is provided to the system by a power cable run from, for example, the wellhead to the completion by being banded to the outside of the tubing or installed within the tubing.

In many applications, splicing of the tubing and power cable may be required. However, such splices can be problematic when the power cable is run through the center of the tubing, particularly when the tubing is continuous tubing, such as coiled tubing. Various attempts have been made to provide splices, but generally such splices are designed for short lengths of coiled tubing containing power cable. Other applications utilize splices that exceed the overall diameter of the coiled tubing and are not spoolable on a conventional coiled tubing workover reel.

Additionally, if a coiled tubing connector, such as a dimple-on connector, is used to splice the coiled tubing, conventional power cable splices do not fit through such tubing connectors. If a conventional power cable splice is made, the splice is essentially fixed and allows for little or no absorption of vertical movement of the power cable in the area of the coiled tubing splice. This can result in the power cable splice directly absorbing tensile and compressive loads acting on the power cable.

SUMMARY OF THE INVENTION

The present invention relates generally to a splicing technique for use in splicing tubing having an internal power cable. An exemplary application comprises the splicing of both a continuous tubing and an internal power cable used to deploy and power a variety of completions, such as electric submersible pumping systems.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

The present technique relates to spliced tubing systems that are amenable to use in subterranean environments, such as wellbores formed for the production of a variety of desired fluids. The technique permits the combined splicing of deployment tubing and power cable used in routing power inside the deployment tubing to a completion, such as an electric submersible pumping system. The following description is of one exemplary application of the technique, but the description should not be construed as limiting. The splicing technique can be utilized in a variety of environments and applications.

Figure 1:
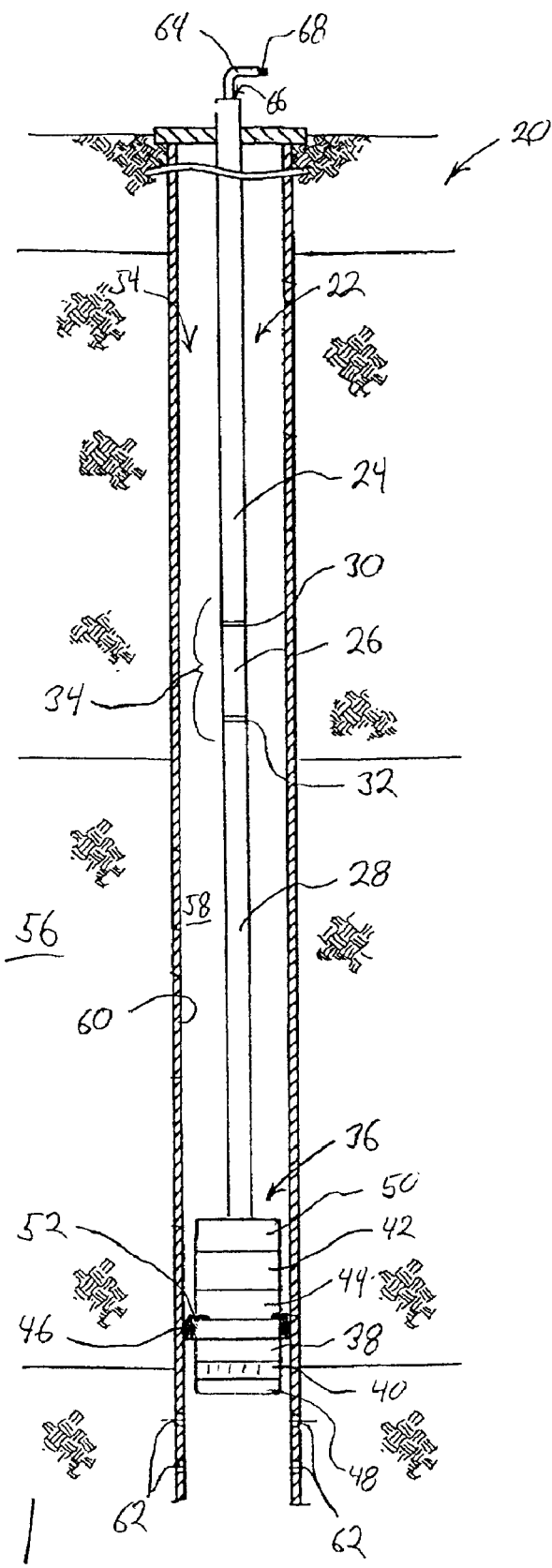
FIG. 1 is a front elevational view of an exemplary completion deployed in a subterranean environment by deployment tubing having an internal cable, according to one embodiment of the present invention.

Referring generally to FIG. 1, an exemplary subterranean system 20 is illustrated. In this example, a deployment system 22 is formed of sections of deployment tubing 24, 26 and 28, although the system may comprise additional tubing sections and splices. Deployment tubing sections 24, 26 and 28 typically are formed of a type of continuous tubing, such as coiled tubing. In this embodiment, coiled tubing section 26 is an intermediate section coupled to tubing sections 24 and 28 by a pair of mechanical connectors 30 and 32, respectively.

As illustrated, mechanical connectors 30 and 32 may be designed with diameters that do not substantially exceed the diameters of deployment tubing sections 24, 26 and 28. In this manner, deployment tubing sections 24 and 28 are effectively coupled by a splice or splice system 34 that does not substantially extend radially beyond the diameter of the tubing. Typically, intermediate tubing section 26 and mechanical connectors 30 and 32 are flush with deployment tubing sections 24 and 28.

Deployment system 22 may be utilized in the deployment of a wide variety of devices or systems in a subterranean environment. One example of such a system is an electric submersible pumping system 36 which is illustrated as a bottom intake pumping system. Exemplary components of such a system comprise a submersible pump 38, a pump intake 40, a submersible motor 42, a motor protector 44 and a packer assembly 46.

However, a variety of other or additional components can be utilized in this or other types of pumping systems. For example, submersible pumping system 36 may include a thrust section 48 and a connector 50 by which submersible pumping system 36 is coupled to deployment system 22. Also, a variety of component types may be utilized. For example, submersible motor 42 may comprise a three-phase, induction-type motor, and submersible pump 38 may comprise a multi-stage centrifugal pump. In this type of system, submersible pump 38 draws wellbore fluid through pump intake 40 and discharges it through a packer discharge head 52, located above packer assembly 46, into the annulus surrounding deployment system 22.

The deployment system 22 is utilized in a well 54 within a geological formation 56 that contains production fluids, such as oil. In a typical application, a wellbore 58 is drilled and lined with a wellbore casing 60. Wellbore casing 60 may include a plurality of openings 62, often referred to as perforations, through which production fluids flow into wellbore 58. Furthermore, a power cable 64 is disposed within a hollow interior 66 of deployment system 22. The power cable 64 is supported within the tubing of deployment system 22 by appropriate mechanisms, such as anchors, buoyancy fluid, friction, or other devices. Additionally, power cable 64 comprises one or more conductors 68. In the example illustrated, power cable 64 comprises at least three conductors 68 to deliver three-phase power to submersible motor 42. Additionally, power cable 64 may comprise other types of conductors, optical fibers, hydraulic lines, pneumatic lines, and other communication lines.

Figure 2:
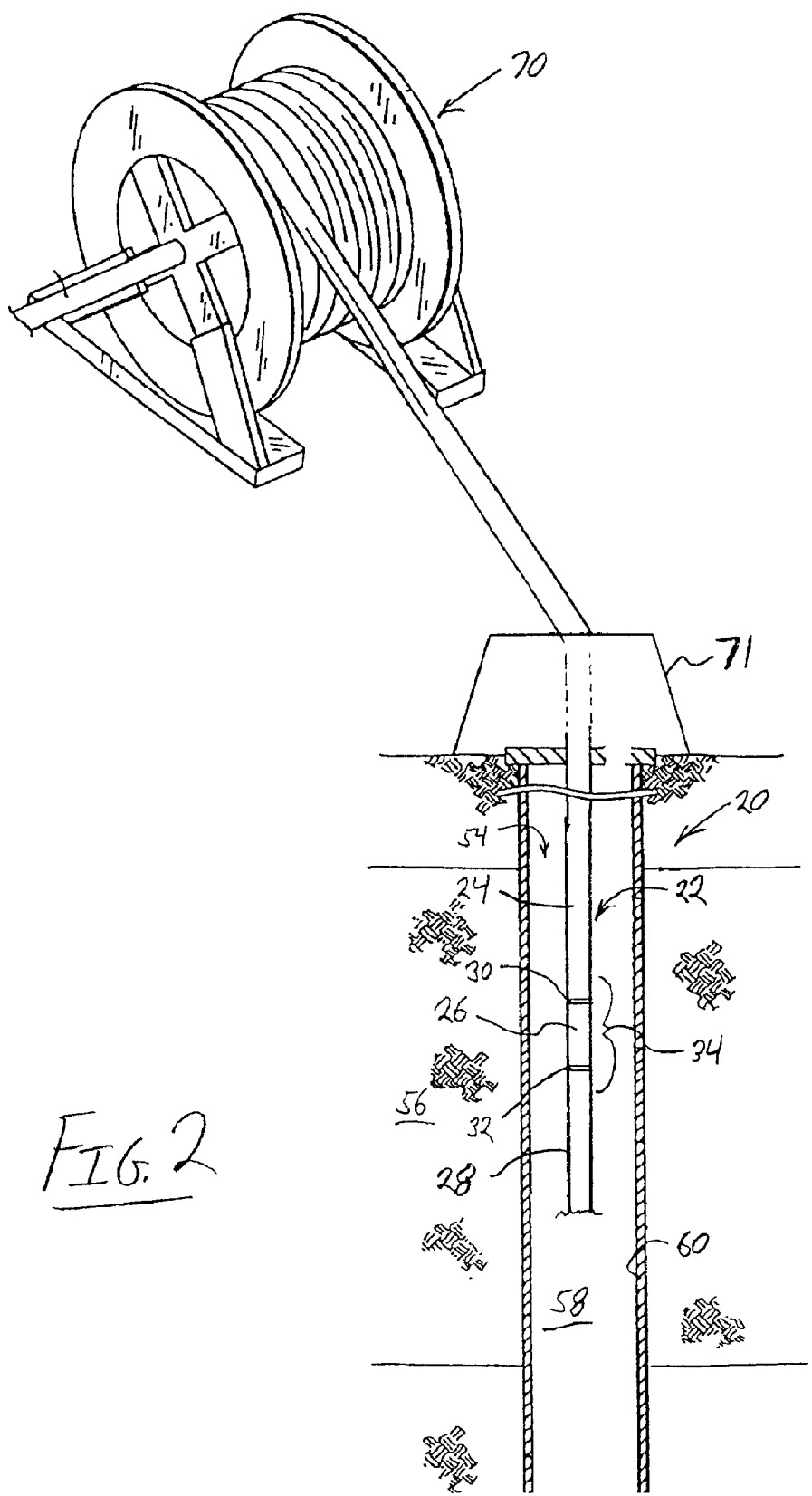
FIG. 2 is a view similar to FIG. 1 but showing the deployment tubing being unrolled from a reel.

In the embodiment illustrated, deployment tubing sections 24, 26 and 28 are formed of tubing that is spoolable, as illustrated in FIG. 2. For example, the sections may be formed of coiled tubing that can be transported, deployed and retrieved via a workover reel 70 and a coiled tubing injector 71, as known to those of ordinary skill in the art. Splice system 34 also is spoolable to permit splicing of tubing sections 24 and 28 prior to spooling the tubing for delivery to a well site. The spoolability also permits spliced sections of tubing to be retrieved from a wellbore by wrapping the entire system onto reel 70.

In addition to being spoolable, splice system 34 is designed to absorb vertical movement of the power cable in the area of the splice. Therefore, the splice does not directly absorb tensile or compressive loads that would otherwise be induced if the power cable underwent vertical movement. Assembly and use of an exemplary splice system 34 is described with general reference to FIGS. 3–11.

Figures 3, 4, 5:
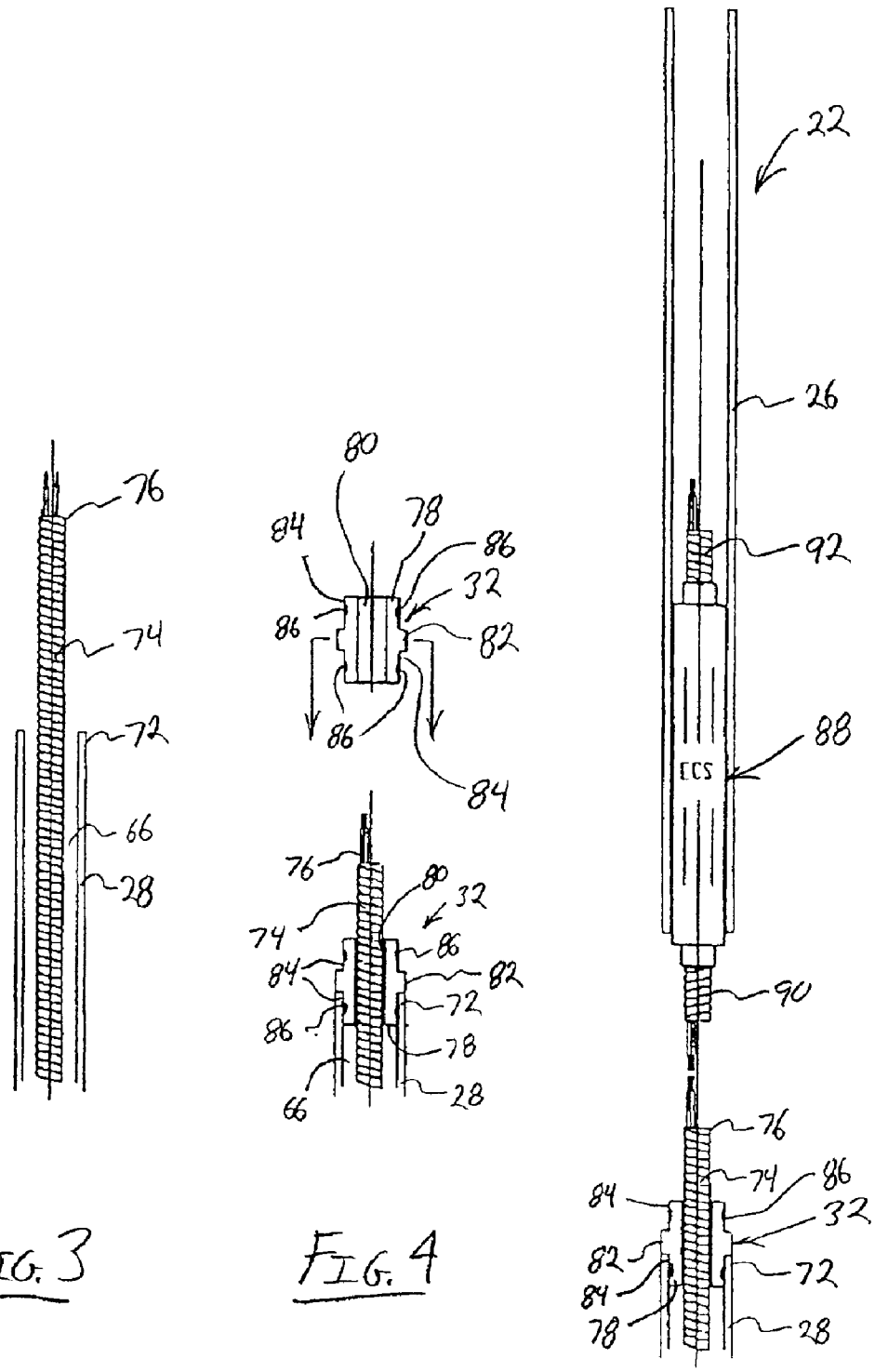
FIG. 3 is a view of a section of deployment tubing with an internal power cable.
FIG. 4 is a view similar to FIG. 3 but showing a coupling mechanism disposed at the end of the tubing.
FIG. 5 illustrates an electronic connector system located proximate the power cable and tubing end illustrated in FIG. 4.
Figure 6:
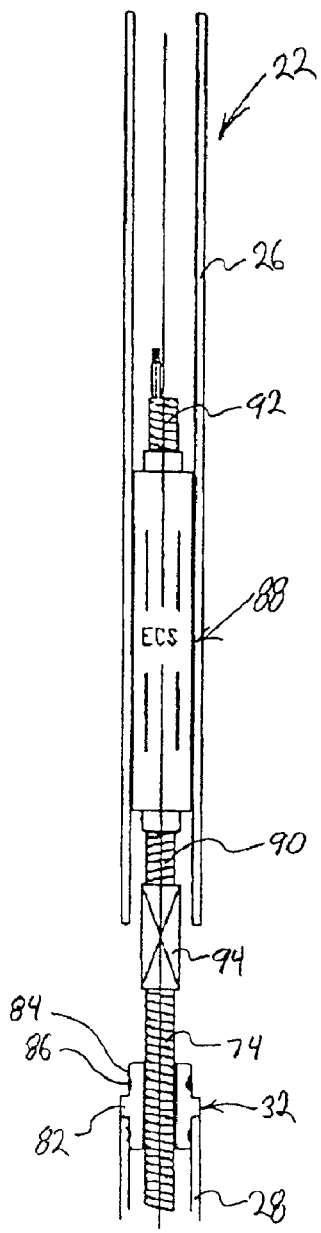
FIG. 6 is a view similar to FIG. 5 illustrating the coupling of the electrical connector system with the power cable.

Referring first to FIG. 3, the lower section 28 of the deployment tubing is illustrated with an open end 72 to be spliced. Within tubing section 28, a power cable segment 74 also is illustrated with an end 76 to be spliced. Power cable segment 74 is one section of the overall power cable 64 utilized in deployment system 22.

Formation of splice system 34 is initiated by sliding mechanical connector 32 over power cable segment 74 and into engagement with the open end 72 of tubing segment 28. An exemplary mechanical connector 32 comprises a "dimple-on" connector. Dimple-on connectors are made, for example, by B D Kendle Engineering Limited, having a place of business at Gapton Hall Road, Gapton Hall Industrial Estate, Great Yarmouth, Norfolk NR31 ONL, UK. In FIG. 4, mechanical connector 32 is shown at two locations, i.e., separated from tubing segment 28 and attached to end 72 of tubing segment 28, to facilitate explanation of the use of mechanical connector 32.

The exemplary connector comprises a body 78 having a generally longitudinal opening 80 through which power cable segment 74 extends when the connector 32 is attached to tubing segment 28. Body 78 further comprises an annular expanded portion 82 separating a pair of engagement surfaces 84 sized for sliding receipt in the corresponding tubing segment. In FIG. 4, for example, the lower engagement surface 84 is slid into hollow interior 66 of end 72 until annular expanded portion 82 is engaged by end 72. Annular expanded portion 82 typically extends radially outward a distance approximately equal to the thickness of the tubing segments to which it is attached so the connector is flush or at least does not extend substantially beyond its adjacent tubing segments.

Body 78 also may comprise a plurality of dimples or recessed regions 86 designed to facilitate secure connection with the adjacent tubing segment. As known to those of ordinary skill in the art, such dimple-on connectors are securely attached to a tubing segment by pressing or otherwise deforming portions of the tube end, e.g. end 72, into recessed portions 86.

Once connector 32 is secured to end 72, the intermediate segment 26 of the deployment tubing is brought into proximity with segment 28, as best illustrated in FIG. 5. Within tubing segment 26, an electrical connector system 88 is disposed. Electrical connector system 88 is an expandable connector having a first power cable connector end 90 positioned for electrical connection with power cable segment 74 associated with tubing segment 28. Electrical connector system 88 also comprises a second power cable connector end 92 disposed generally opposite first power cable connector end 90. As further illustrated in FIG. 6, first power cable connector end 90 is electrically coupled with power cable segment 74 via a power cable splice 94. Although a variety of mechanisms can be utilized to form power cable splice 94, a conventional electric submersible pumping system power cable splice, commonly used in downhole environments, may be utilized.

Figure 7:
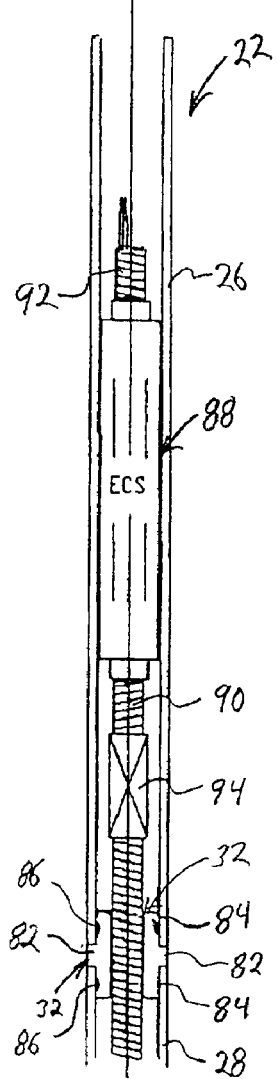
FIG. 7 illustrates the coupling of an intermediate tubing section surrounding the electrical connector system with the section of tubing.

Once power cable splice 94 is formed, intermediate tubing segment 26 is slid along electrical connector system 88 into engagement with the available engagement surface 84 of connector 32, as illustrated best in FIG. 7. Electrical connector system 88 also may undergo contraction to permit engagement of tubing segment 26 with connector 32. The intermediate tubing segment 26 is secured to connector 32 in the same manner as described above with respect to tubing segment 28.

Figure 8:
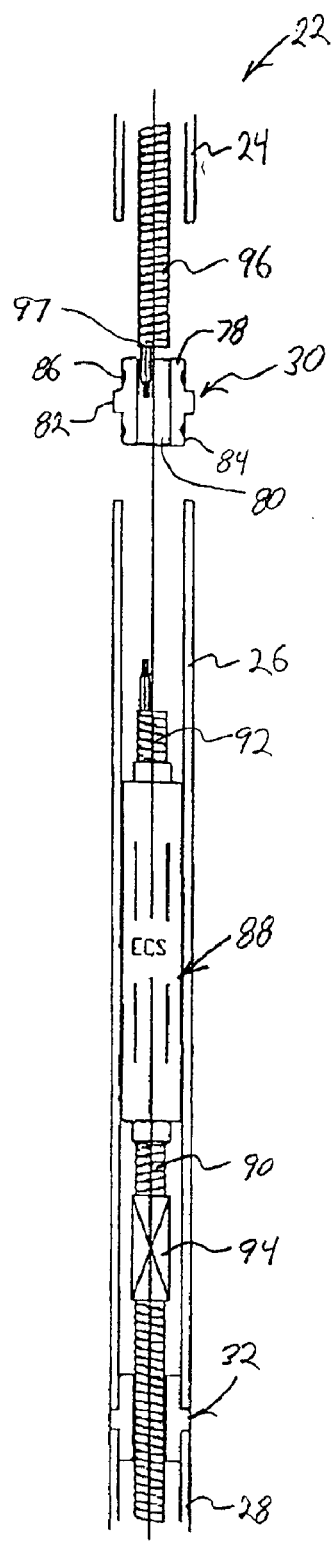
FIG. 8 illustrates the movement of a second power cable into position for connection with an opposite end of the electrical connector system illustrated in FIG. 7.

As illustrated in FIG. 8, intermediate tubing segment 26 also is designed for coupling to tubing segment 24 via mechanical connector 30. An exemplary mechanical connector 30 is a dimple-on type connector that is similar or the same as connector 32. Accordingly, the same reference numerals have been used to label the various features of mechanical connector 30.

As illustrated, within deployment tubing segment 24 is a power cable segment 96 having a power cable end 97 disposed for connection to second power cable connector end 92 of electrical connector system 88. As further illustrated in FIG. 9, connector 30 is moved into engagement with a splice end 98 of tubing segment 24. As described above, the corresponding engagement surface 84 is slid into the hollow interior 66 of end 98. The extent of insertion is limited by annular expanded portion 82, and tubing segment 24 is secured to connector 30 by, for example, deforming end 98 into the recessed regions 86 of connector 30.

Figure 9:
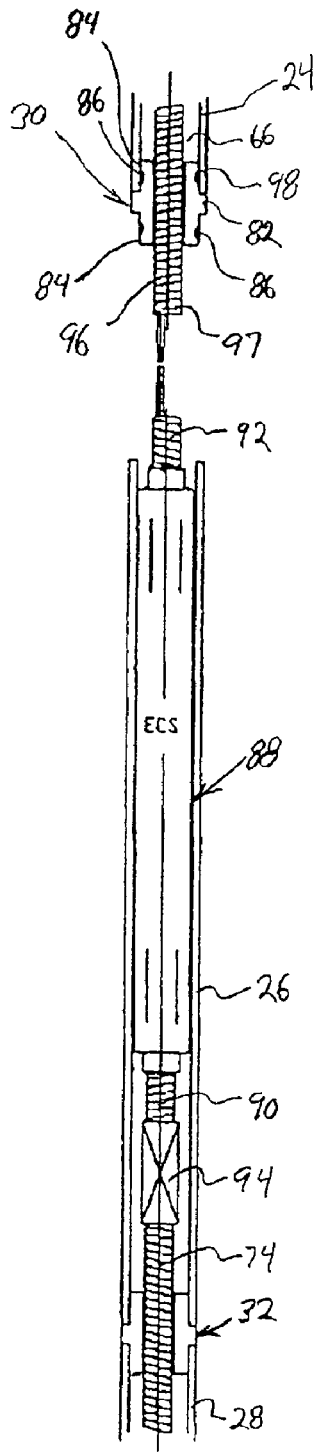
FIG. 9 illustrates attachment of a coupling mechanism to another section of tubing proximate the intermediate tubing section surrounding the electrical connector system.
Figure 10:
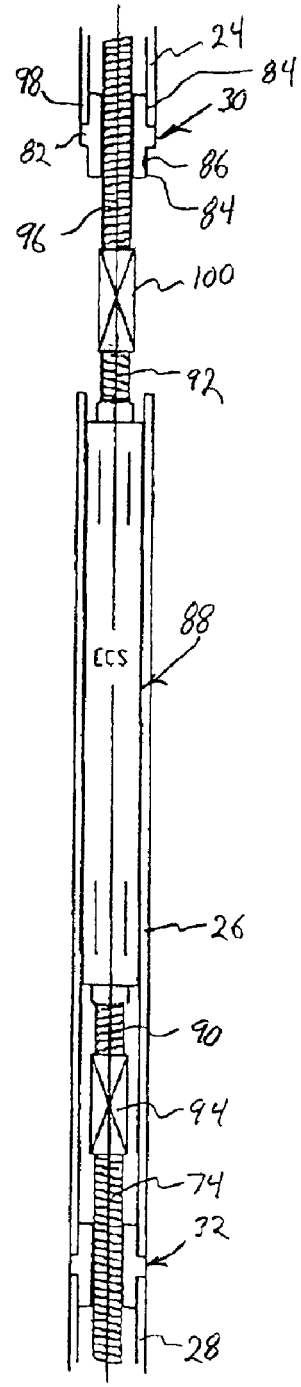
FIG. 10 illustrates the coupling of the power cable with the opposite end of the electrical connector system.

As illustrated best in both FIGS. 9 and 10, electrical connector system 88 is extended such that second power cable connector end 92 extends beyond intermediate tubing segment 26 for electrical connection with the power cable segment 96 associated with deployment tubing segment 24. As described above, second power cable connector end 92 and power cable segment 96 may be electrically coupled by a variety of mechanisms. However, a conventional electric submersible pumping system power cable splice 100 works well to accomplish the coupling of power cable segments.

Figure 11:
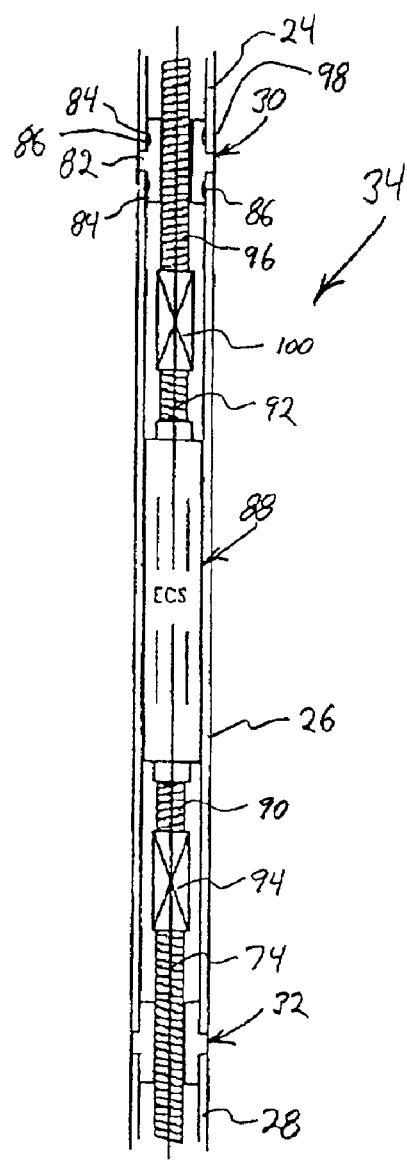
FIG. 11 illustrates completion of both the electrical and physical coupling of the power cable and deployment tubing, respectively.

Once the power cable splice 100 is formed, electrical connector system 88 is contracted to permit movement of tubing segment 24 and connector 30 into engagement with intermediate tubing section 26, as illustrated in FIG. 11. As described above, the appropriate engagement surface 84 is slid into the hollow interior 66 of intermediate tubing section 26 so that the tubing section may be mechanically secured to connector 30. At this point, tubing sections 24, 26 and 28 have been mechanically secured to one another, and internal power cable segments 96 and 74 have been electrically and mechanically coupled across electrical connector system 88. Although only a single splice 34 has been illustrated and described, additional splices can be formed in a given deployment system.

Once splice 34 is formed, there typically are no substantial, if any, radial protrusions beyond the diameter of tubing segments 24, 26 and 28. Exemplary tubing segments comprise coiled tubing segments of the same or comparable diameter. Additionally, splice 34 may be freely wrapped and unwrapped from a reel, such as reel 70, to facilitate deployment and/or retrieval of a completion, such as electric submersible pumping system 36.

Figure 12:
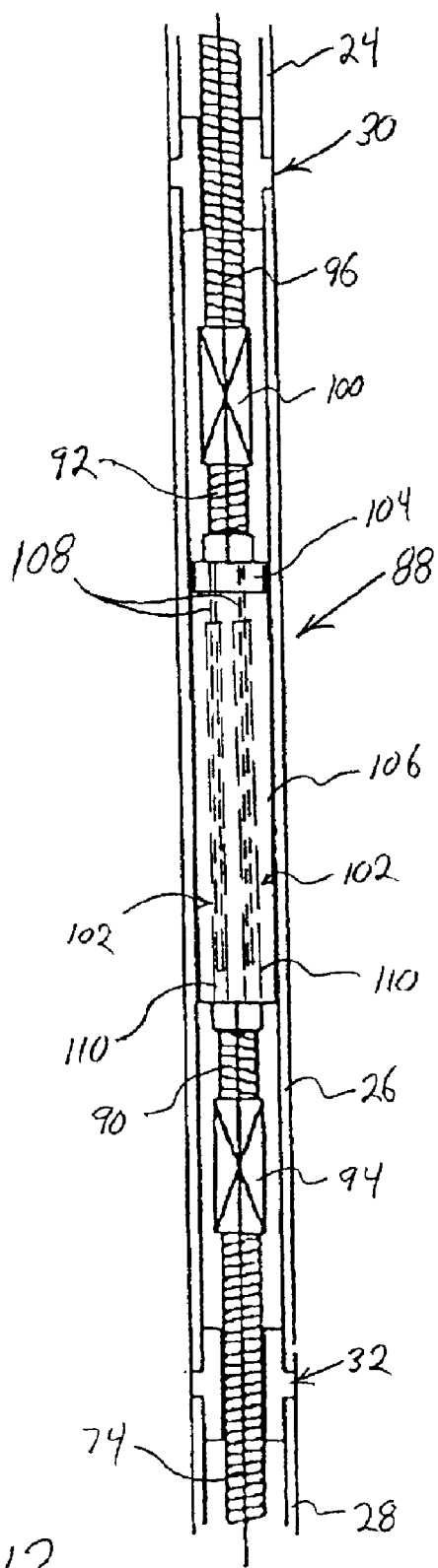
FIG. 12 illustrates one exemplary embodiment of the electrical connector system illustrated in FIG. 11.

Although other designs fall within the scope of the present invention, one exemplary electrical connector system 88 is illustrated in FIG. 12. In this system, the electrical connector comprises one or more sliding electrical contacts 102 that permit extension and contraction of electrical connector 88. The exemplary electrical connector 88 comprises a first housing 104 received in slidable engagement with a second housing 106. Also, a plurality of conductive rods or wands 108, e.g. three rods 108, are electrically coupled to corresponding conductors in second power cable connector end 92. The rods or wands 108 are examples of conductive extensions that are slidably received in and form electrical contact with a plurality of corresponding receptacles 110, e.g. three receptacles 110, formed in or extending from second housing 106. Receptacles 110 are conductive and coupled with corresponding conductors of first power cable connector end 90. Thus, an electrical connection is formed along the individual conductors of power cable segment 96, second power cable end 92, corresponding rods 108 and receptacles 110, first power cable connector end 90 and power cable segment 74.

When electrical connector system 88 is extended, rods 108 are drawn outwardly with respect to receptacles 110 while maintaining electrical contact. Similarly, when connector system 88 is contracted, rods 108 maintain contact with receptacles 110 as they are slid inwardly along receptacles 110. Thus, lineal movement of the power cable segments during formation of splice 34 or utilization of deployment system 22 is accommodated by electrical connector system 88.

It should be understood that the foregoing description is of exemplary embodiments of this invention, and that the invention is not limited to the specific forms shown. For example, various types of power cable may be utilized; the mechanical connection of tubing segments can be accomplished by other spoolable mechanisms; the electrical splicing of power cable segments may be accomplished by other techniques; and the type of expandable electrical connector system can be changed while still accommodating lineal expansion and contraction of the connector. These and other modifications may be made in the design and arrangement of the elements without departing from the scope of the invention as expressed in the appended claims.

What is claimed is:

1. A tubing system for use in a subterranean environment, comprising:
   an upper tubing section having an upper power cable segment therein;
   a lower tubing section having a lower power cable segment therein; and
   an intermediate tubing section having an electrical connector that is axially expandable therein, wherein the upper and the lower tubing sections are coupled to generally opposite ends of the intermediate tubing section and the electrical connector is electrically coupled to the upper and lower power cable segments, wherein the upper and lower tubing sections comprise coiled tubing and the upper tubing section is coupled to the intermediate tubing section by a dimple-on connector.

2. The tubing system as recited in claim 1, wherein the lower tubing section is coupled to the intermediate tubing section by a dimple-on connector.

3. The tubing system as recited in claim 1, wherein the electrical connector comprises a sliding contact to permit axial elongation and contraction.

4. A tubing system for use in a subterranean environment, comprising:
   an upper tubing section having an upper power cable segment therein;
   a lower tubing section having a lower power cable segment therein; and
   an intermediate tubing section having an electrical connector that is axially expandable therein, wherein the upper and the lower tubing sections are coupled to generally opposite ends of the intermediate tubing section and the electrical connector is electrically coupled to the upper and lower power cable segments, wherein the electrical connector comprises a sliding contact to permit axial elongation and contraction and the sliding contact comprises a plurality of extensions slidably received in a plurality of corresponding receptacles.

5. A tubing system for use in a subterranean environment, comprising:
   an upper tubing section having an upper power cable segment therein;
   a lower tubing section having a lower power cable segment therein; and
   an intermediate tubing section having an electrical connector that is axially expandable therein, wherein the upper and the lower tubing sections are coupled to generally opposite ends of the intermediate tubing section and the electrical connector is electrically coupled to the upper and lower power cable segments, the upper and lower tubing sections comprising coiled tubing, wherein the intermediate tubing section and electrical connector may be spooled onto a workover reel.

6. A system, comprising:
   an intermediate tubing section coupled to a pair of adjacent tubing sections by a pair of mechanical connectors each having an outside diameter that does not substantially exceed the diameter of each adjacent tubing section;
   a power cable extending through the pair of tubing sections, the power cable being spliced by an electrical connector disposed within the intermediate tubing section between the pair of mechanical connectors; and an electric submersible pumping system coupled to one of the adjacent tubing sections, the electric submersible pumping system having a submersible motor, wherein the power cable has a plurality of conductors to deliver three-phase power to the submersible motor.

7. The system as recited in claim 6, wherein the pair of adjacent tubing sections comprise coiled tubing.

8. The system as recited in claim 6, wherein the pair of adjacent tubing sections and the intermediate tubing section have common diameters.

9. The system as recited in claim 6, wherein the electrical connector is expandable within the intermediate tubing section.

10. The system as recited in claim 7, wherein each mechanical connector of the pair of mechanical connectors has a diameter no greater than the diameter of the pair of adjacent tubing sections.

11. The system as recited in claim 10, wherein each mechanical connector comprises a dimple-on connector.

12. The system as recited in claim 6, wherein the electrical connector comprises a sliding contact to permit axial elongation and contraction.

13. The system as recited in claim 12, further comprising an electric submersible pumping system coupled to the power cable and to one of the pair of tubing sections.

14. An electrical connector for connecting segments of power cable, comprising:

an outer housing sized to fit within a segment of coiled tubing;

a conductive receptacle disposed within the outer housing, the conductive receptacle being electrically coupled to a first power cable segment; and a conductive extension sized for slidable receipt in the conductive receptacle, the conductive extension being coupled to a second power cable segment.

15. The electrical connector as recited in claim 14, wherein the conductive receptacle comprises three conductive receptacles and the conductive extension comprises three conductive extensions.

16. The electrical connector as recited in claim 15, further comprising a coiled tubing segment positioned around the outer housing.

17. A method for splicing tubing having an internal power cable for use in providing power to an electric submersible pumping system, comprising:

coupling an intermediate tubing section between a pair of tubing sections of equal diameter to the intermediate tubing section via a pair of mechanical connectors; and splicing an internal power cable within the intermediate tubing section wherein;

splicing comprises connecting an upper and a lower segment of the power cable to an electrical connector disposed between the pair of mechanical connectors.

18. The method as recited in claim 17, further comprising forming the electrical connector as a longitudinally adjustable electrical connector.

19. The method as recited in claim 18, wherein forming comprises placing a conductive rod in slidable engagement with a corresponding receptacle.

20. The method as recited in claim 18, wherein forming comprises placing three conductive rods in slidable engagement with three corresponding receptacles.

21. The method as recited in claim 20, wherein splicing comprises forming an electrical splice above and below the electrical connector.

22. The method as recited in claim 17, further comprising connecting an electric submersible pumping system to one of the pair of tubing sections.

23. The method as recited in claim 22, further comprising powering the electric submersible pumping system via the internal power cable.

24. The method as recited in claim 17, wherein coupling comprises utilizing dimple-on connectors as the pair of mechanical connectors.

25. The method as recited in claim 23, wherein coupling comprises utilizing dimple-on connectors as the pair of mechanical connectors.

* * * * *